US010660265B1

(12) United States Patent
Litterly et al.

(10) Patent No.: US 10,660,265 B1
(45) Date of Patent: May 26, 2020

(54) CONDENSER, USEFUL FOR MOBILE TANK NH3 FERTILIZER APPLICATIONS, COMBINABLE WITH VARIOUS OPTIONS

(71) Applicants: Randall S. Litterly, Elkhart, IL (US); Douglas L. Litterly, Elkhart, IL (US); Rabah Y. Shaath, St. Louis, MO (US)

(72) Inventors: Randall S. Litterly, Elkhart, IL (US); Douglas L. Litterly, Elkhart, IL (US); Rabah Y. Shaath, St. Louis, MO (US)

( * ) Notice: Subject to any disclaimer, the term of this patent is extended or adjusted under 35 U.S.C. 154(b) by 93 days.

(21) Appl. No.: 15/967,959

(22) Filed: May 1, 2018

Related U.S. Application Data

(63) Continuation-in-part of application No. 15/872,485, filed on Jan. 16, 2018, now abandoned.

(60) Provisional application No. 62/446,595, filed on Jan. 16, 2017.

(51) Int. Cl.
*A01C 23/02* (2006.01)
*A01C 23/00* (2006.01)
*B05B 1/14* (2006.01)
*B05B 3/04* (2006.01)
*F16K 11/074* (2006.01)

(52) U.S. Cl.
CPC .......... *A01C 23/024* (2013.01); *A01C 23/007* (2013.01); *B05B 1/14* (2013.01); *B05B 3/04* (2013.01); *F16K 11/0743* (2013.01)

(58) Field of Classification Search
CPC ....... A01C 23/024; A01C 23/007; B05B 1/14; B05B 3/04; F16K 11/0743

USPC .......... 239/135, 139, 159, 163, 172; 62/310, 62/325, 474, 498, 507, 512; 111/118, 111/127
See application file for complete search history.

(56) References Cited

U.S. PATENT DOCUMENTS

| | | | | |
|---|---|---|---|---|
| 2,973,729 | A * | 3/1961 | Peck | A01C 23/024 111/119 |
| 6,269,757 | B1 | 8/2001 | Kiest | A01C 23/02 |
| 7,096,802 | B1 | 8/2006 | Kiest | A01C 23/024 |
| 7,162,961 | B2 * | 1/2007 | Grimm | A01C 23/024 239/159 |
| 7,410,107 | B1 | 8/2008 | Hanna et al. | A01C 23/007 |
| 7,523,709 | B1 | 4/2009 | Kiest | A01C 5/062 |
| 7,775,168 | B2 * | 8/2010 | Sidhwa | A01C 23/022 111/118 |
| 8,191,795 | B2 * | 6/2012 | Grimm | A01M 7/0089 239/159 |
| 8,622,253 | B1 | 1/2014 | Litterly et al. | G05D 11/00 |
| 8,667,916 | B1 | 3/2014 | Kiest | A01C 23/024 |
| 2014/0131469 | A1 * | 5/2014 | Henry | B05B 1/3046 239/172 |
| 2016/0345489 | A1 | 12/2016 | Litterly et al. | A01C 23/024 |

* cited by examiner

*Primary Examiner* — Steven J Ganey
(74) *Attorney, Agent, or Firm* — Jonathan A. Bay

(57) ABSTRACT

A condenser that is useful for mobile tank nh3 fertilizer applications is combinable with various options. A single fluid flows into the condenser by an inlet port in a two-phase fluid flow condition (ie., consisting of a vapor phase and a condensate phase) and, during the flow through the condenser, the single fluid cools itself such that for at least a portion of the flow through the condenser, the flow is a single phase flow of condensate only. The preferred single fluid is anhydrous ammonia (NH3). The condenser is combinable with various other options including flow rate measuring, flow rate regulation, flow distribution to multiple outlets, and so on.

19 Claims, 12 Drawing Sheets

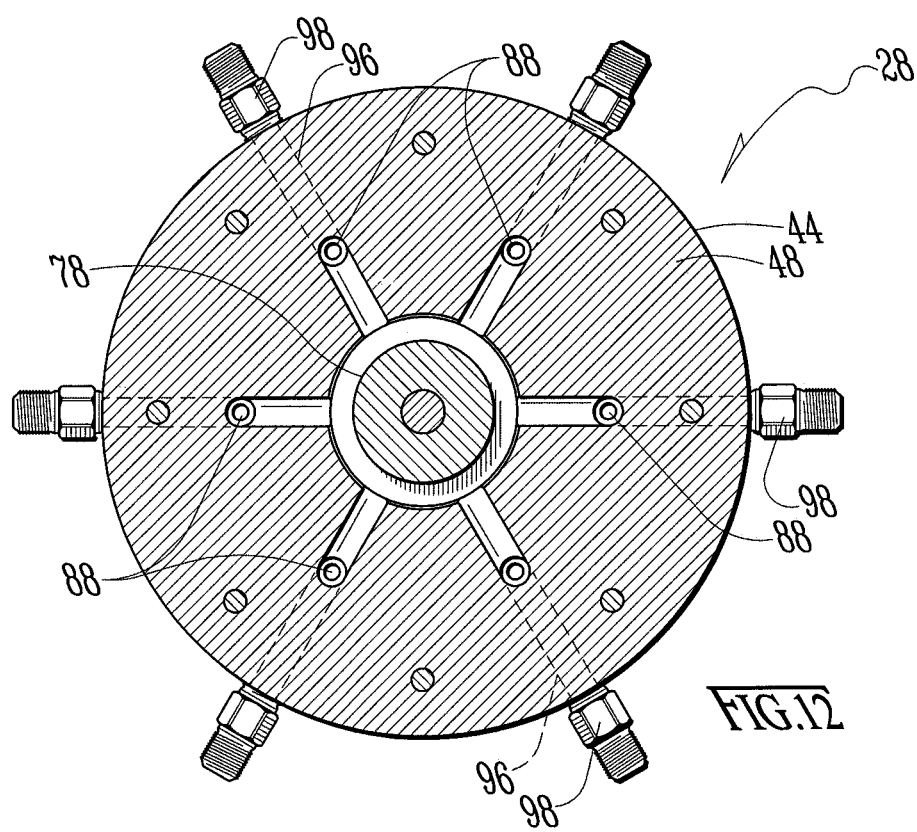

CONDENSER, USEFUL FOR MOBILE TANK NH3 FERTILIZER APPLICATIONS, COMBINABLE WITH VARIOUS OPTIONS

CROSS-REFERENCE TO RELATED APPLICATION(S)

This application is a continuation-in-part of U.S. patent application Ser. No. 15/872,485, filed Jan. 16, 2018; which claims the benefit of U.S. Provisional Application No. 62/446,595, filed Jan. 16, 2017. The foregoing patent disclosure(s) is(are) incorporated herein by this reference thereto.

BACKGROUND AND SUMMARY OF THE INVENTION

The invention relates to a condenser and, more particularly, to a single fluid inline flow condenser. A single fluid flows into the condenser by an inlet port in a two-phase fluid flow condition (ie., consisting of a vapor phase and a condensate phase) and, during the flow through the condenser, the single fluid cools itself such that for at least a portion of the flow through the condenser, the flow is a single phase flow of condensate only. The preferred single fluid is anhydrous ammonia (NH3). This condenser is useful for applications such as mobile tank fertilization of row-crop fields. The condenser is combinable with various other options including:—
  flow rate measuring;
  flow rate regulation;
  flow distribution to multiple outlets, and so on.

The inventorship hereof includes the inventors of U.S. Pat. No. 8,622,253—Litterly et al., entitled "ANHYDROUS AMMONIA FERTILIZER METERING AND DISTRIBUTION APPARATUS AND METHOD," the disclosure of which is incorporated in full herein by this reference thereto.

A number of additional features and objects will be apparent in connection with the following discussion of the drawings and preferred embodiment(s) and example(s).

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 12 is an enlarged-scale sectional view taken in the direction of the arrows in FIG. 11.

DETAILED DESCRIPTION OF THE PREFERRED EMBODIMENTS

Figure 1:
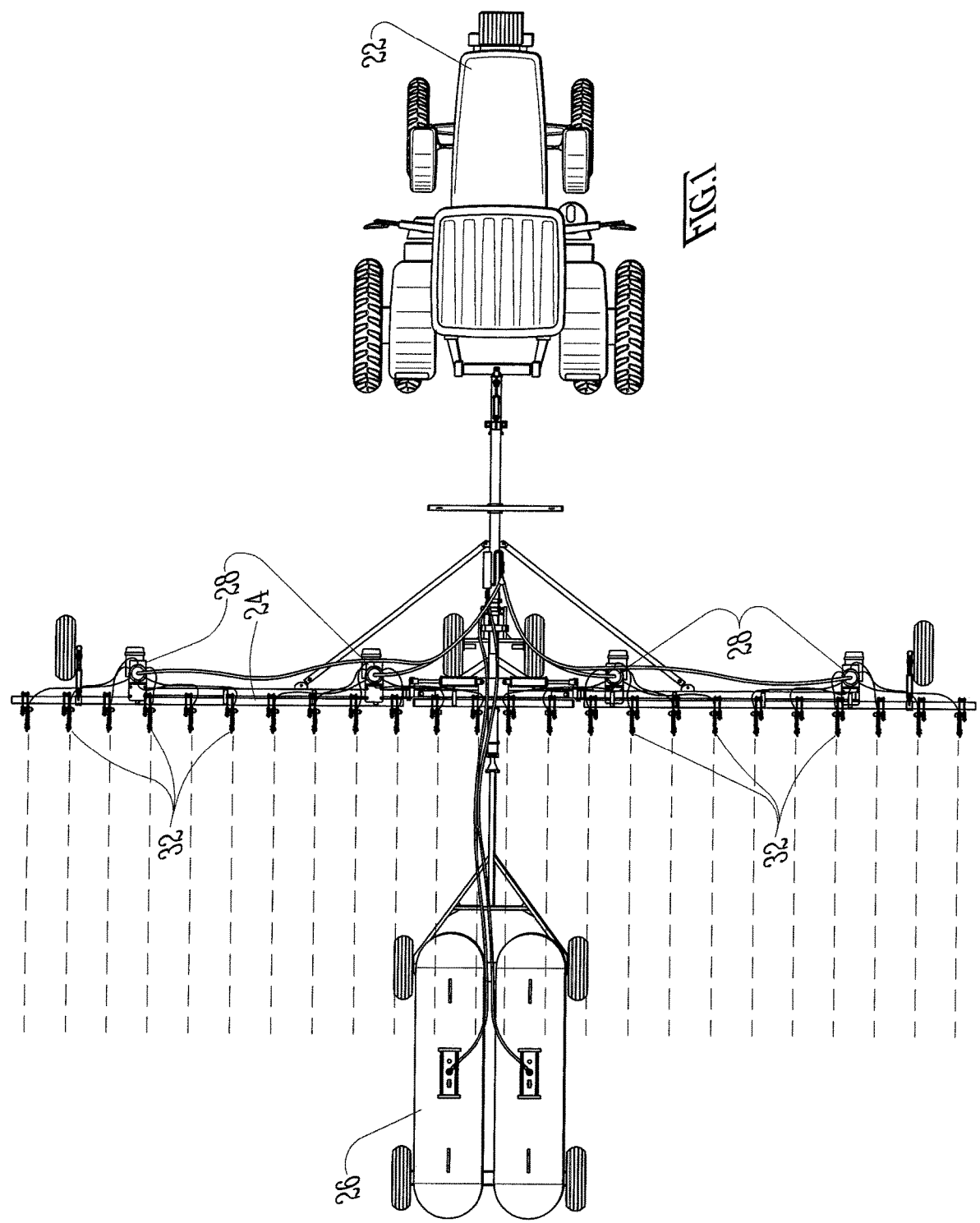
FIG. 1 is a top plan view of a mobile tank fertilization system for row-crop fields, and, including a condenser in accordance with the invention, wherein the disc cultivator is shown on a reduced scale relative to the tractor.
Figure 2:
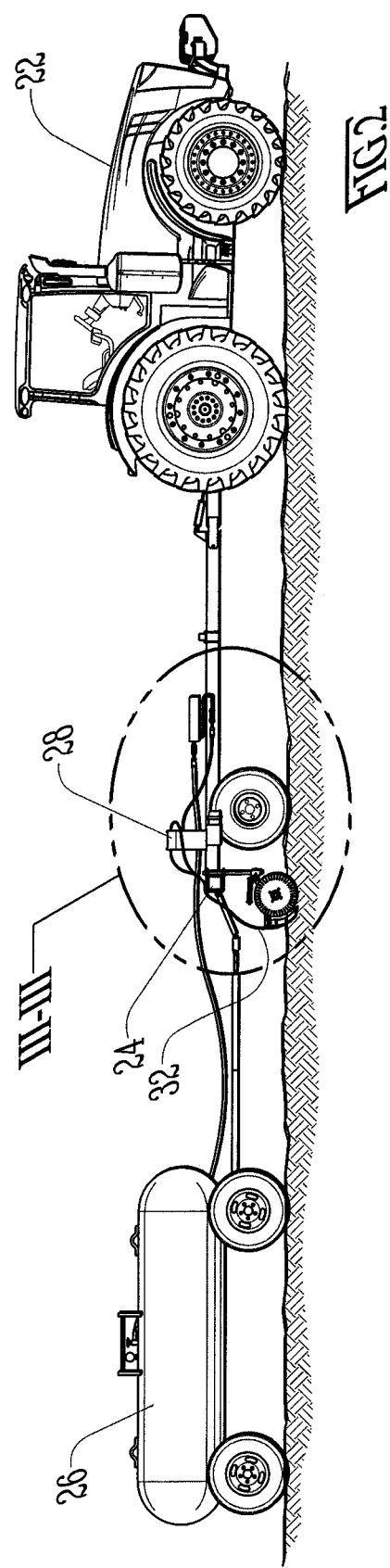
FIG. 2 is a side elevational view thereof.
Figure 3:
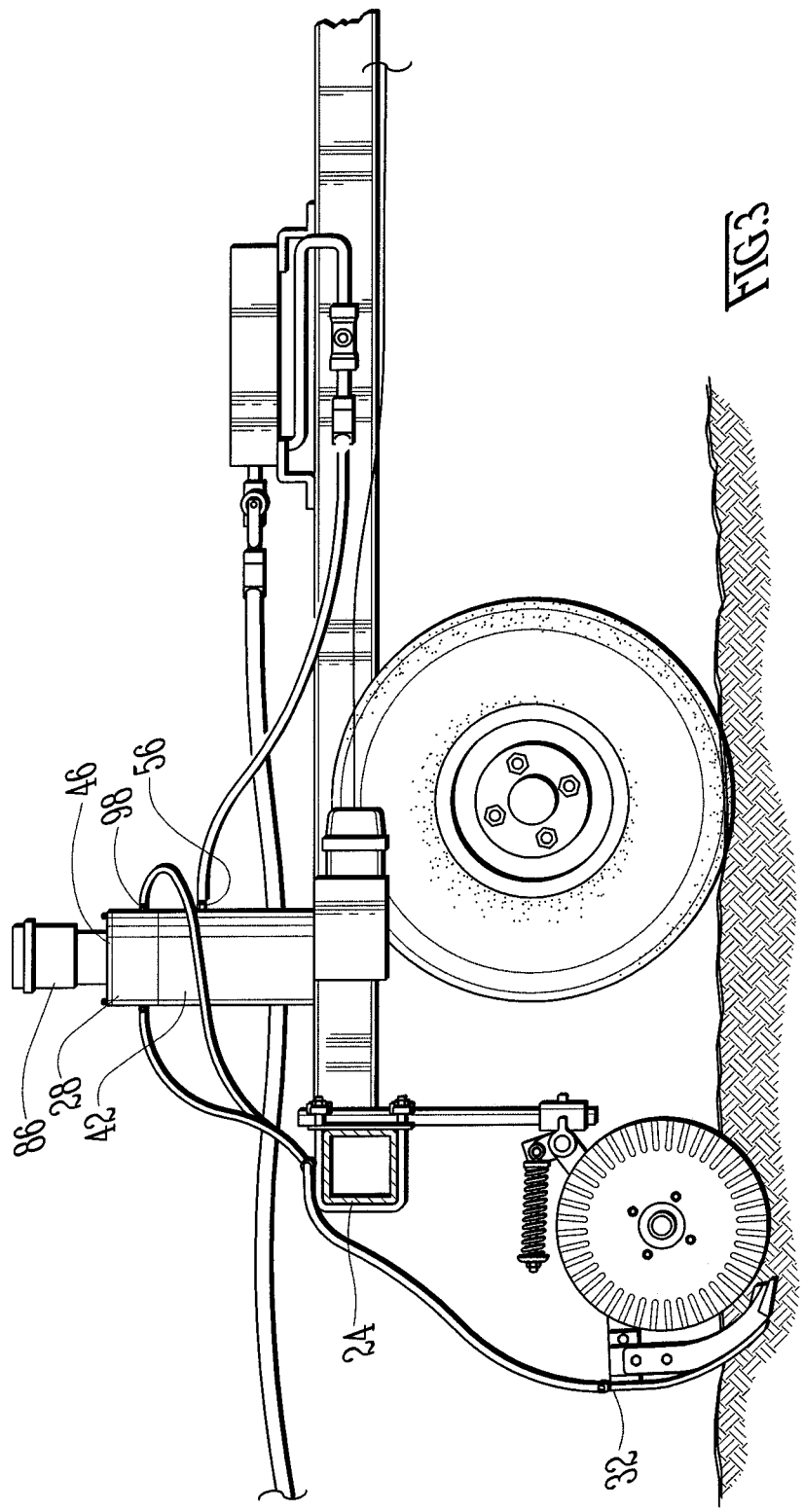
FIG. 3 is an enlarged-scale elevational view of detail III-III in FIG. 2.
Figure 4:
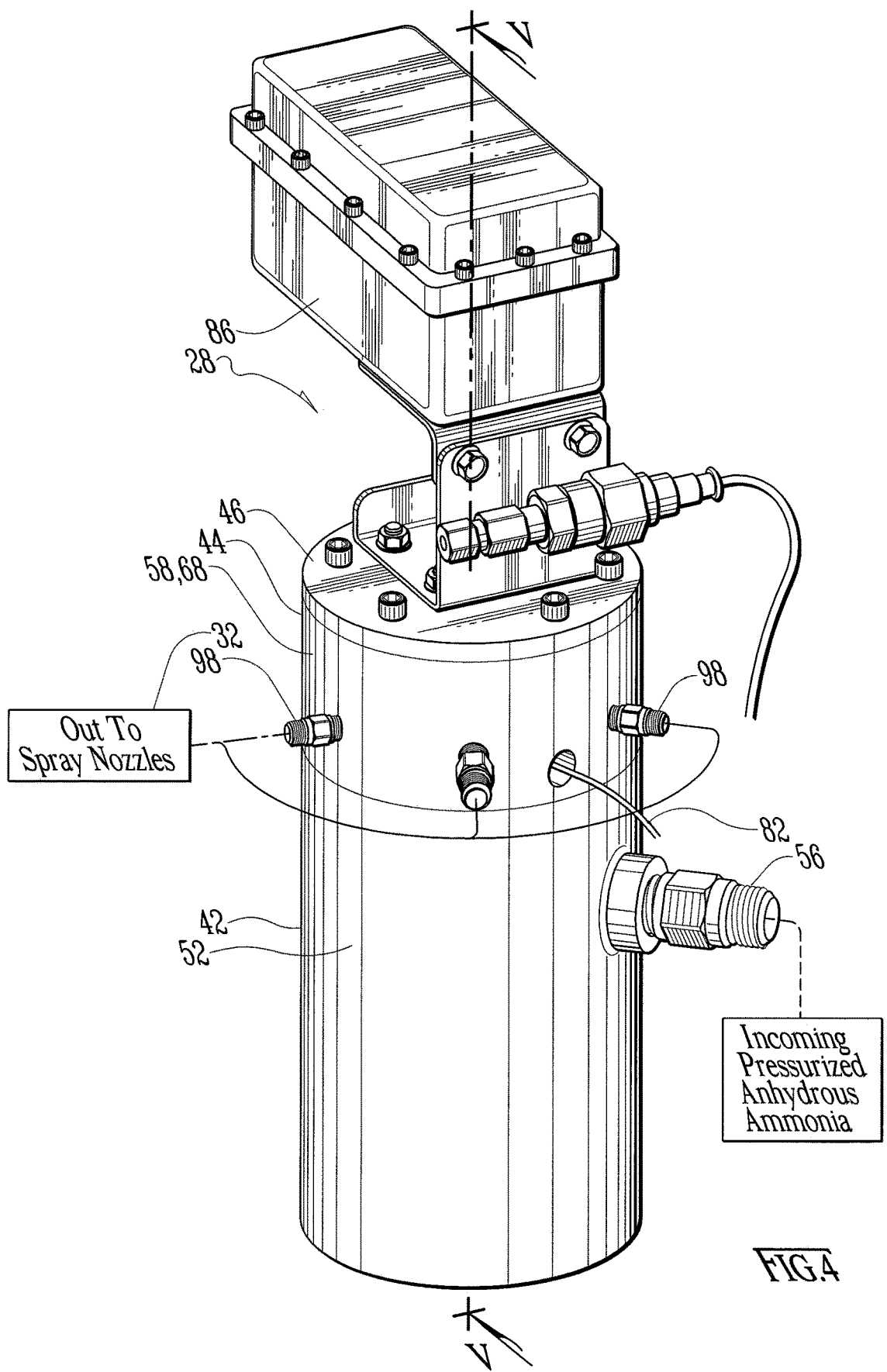
FIG. 4 is an enlarged-scale perspective view of the condenser in accordance with the invention that appears in FIG. 3.

FIGS. 1 and 2 show a tractor 22 towing a tool bar 24 and, further behind the tool bar 24, a pair of mobile tanks 26 of anhydrous ammonia (NH3). The tool bar 24 carries four condensers 28 in accordance with the invention, which also function as flow distributors. As shown in FIG. 1, each condenser 28 distributes flow to the nozzles of six row lines 32 apiece.

Figure 9:
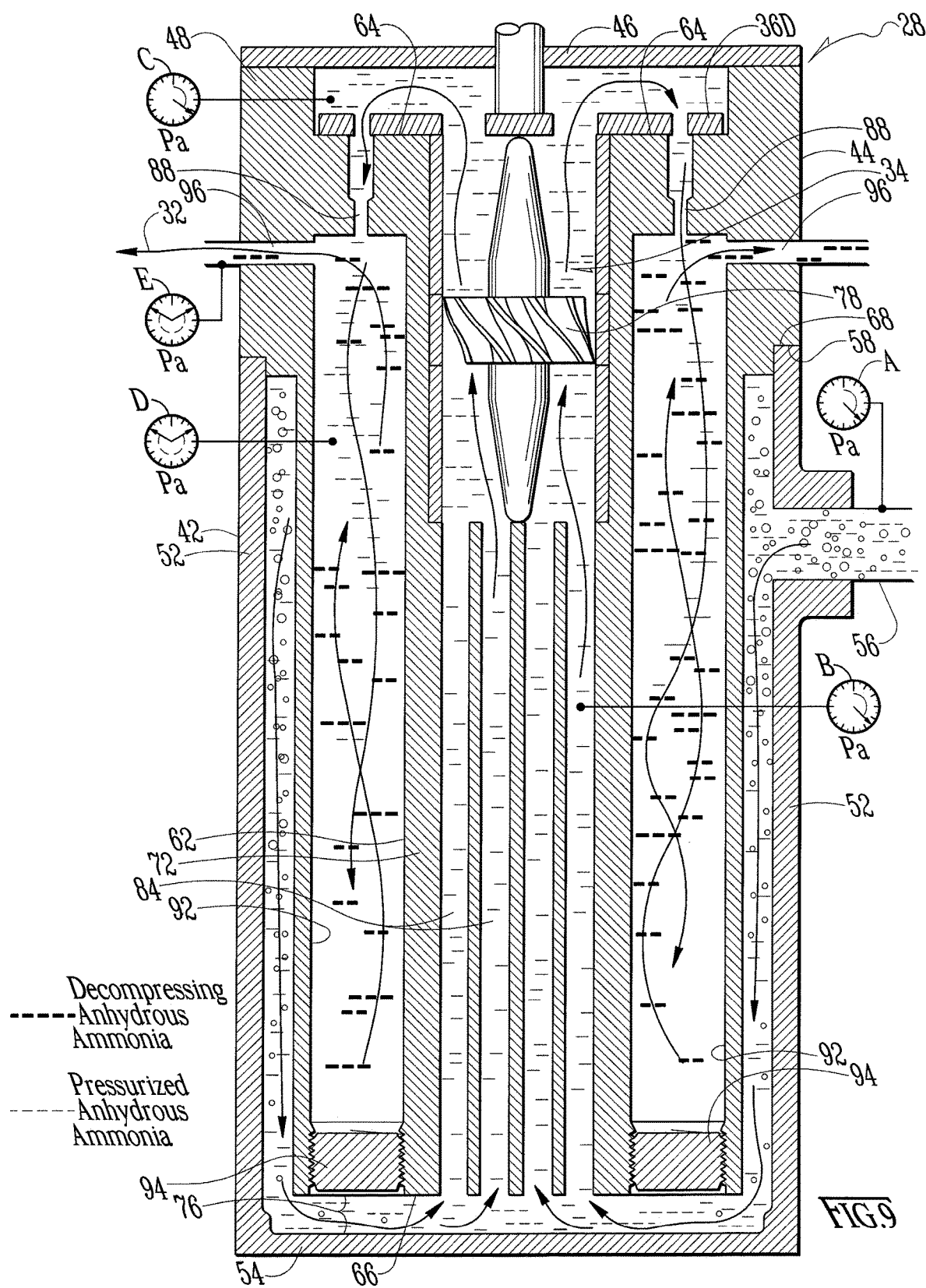
FIG. 9 is an enlarged-scale partial sectional view comparable to FIG. 5 except better showing where the flow path(s) of the working fluid (eg., anhydrous ammonia, or NH3) flows through condenser as two-phase flow (vapor and condensate) in contrast to a single phase flow of condensate alone.
Figure 10:
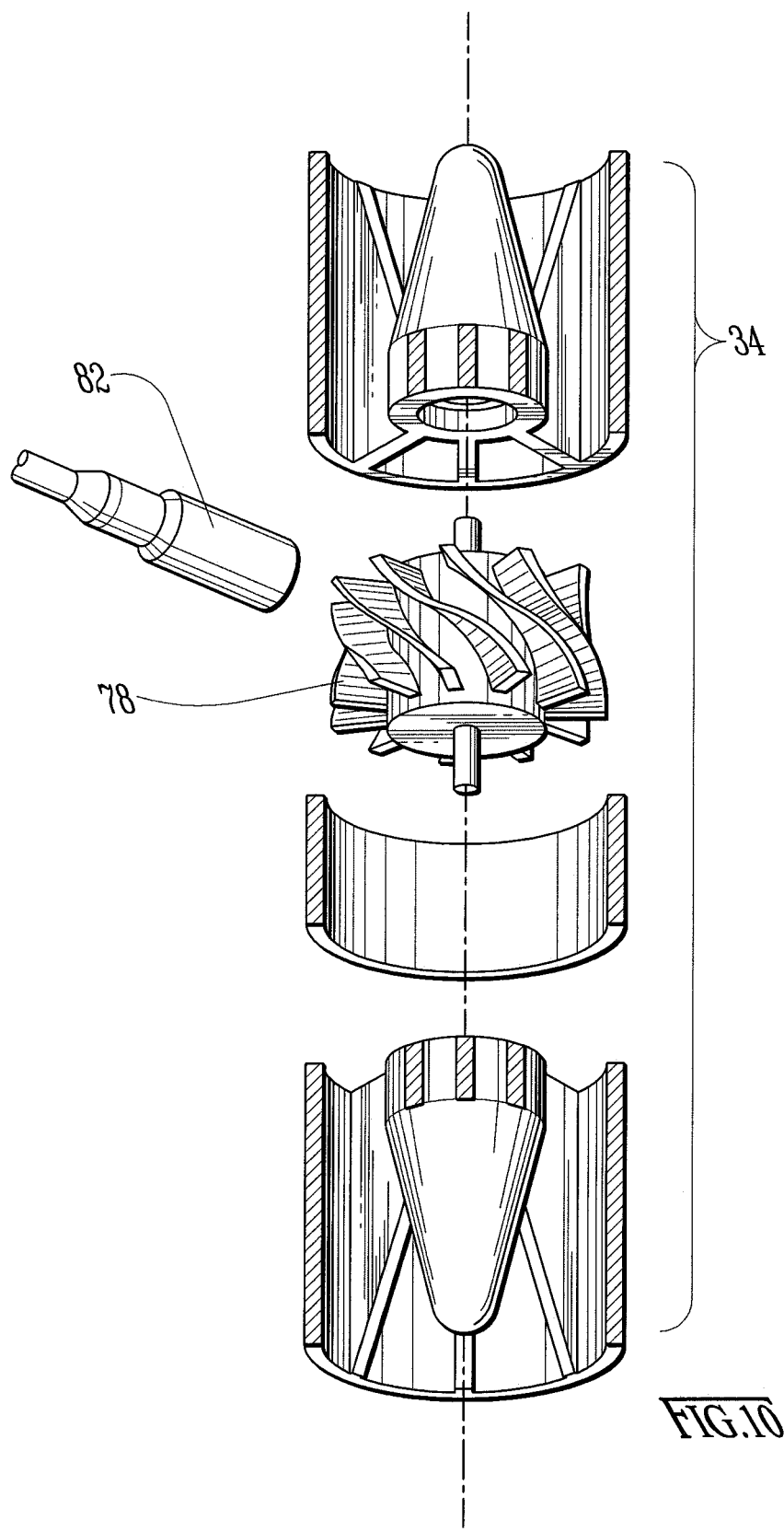
FIG. 10 is an enlarged-scale exploded perspective view, partly in section, of a preferred flow reporting device for the condenser in accordance with the invention.
Figure 11:
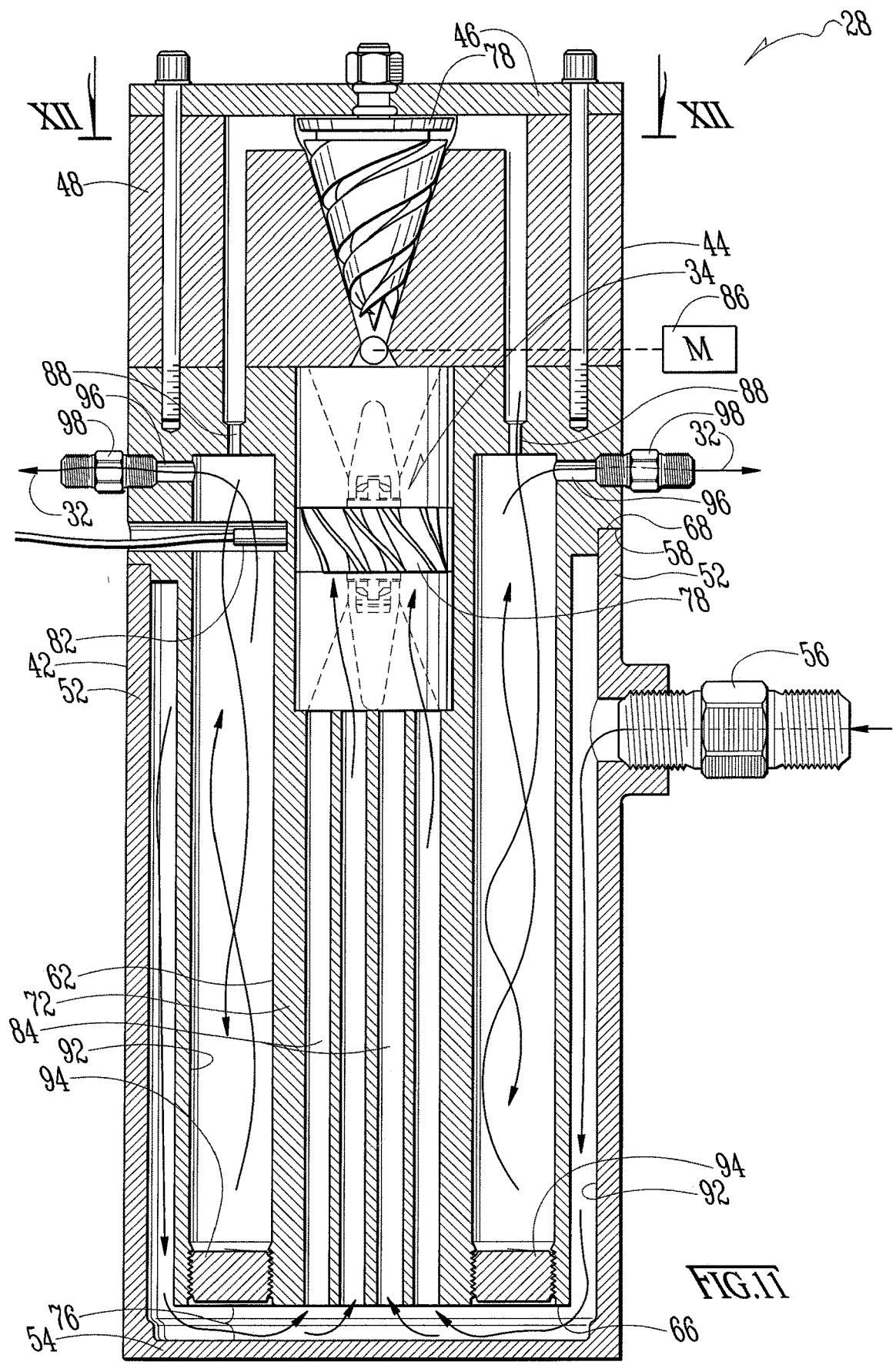
FIG. 11 is an enlarged-scale partial sectional view comparable to FIG. 5 except showing an alternate embodiment of a condenser in accordance with the invention, including an alternate flow rate regulating valve and an alternate impeller for flow distribution.

FIGS. 3-9 show a first embodiment of a condenser 28 in accordance with the invention. FIGS. 11-12 show a second embodiment. Unlike FIGS. 1 and 2, both embodiments of the condenser 28 shown in FIGS. 3-9 and 11-12 distribute flow to six row lines 32. The condenser 28 serves multiple purposes:—
  the condenser 28 is a flow condenser to condense an infeed of a two-phase flow of vapor and condensate to a single-phase flow of condensate, for at least a portion of the flow path through the condenser 28;
  the condenser 28 houses a flow-rate measuring (ie., reporting) device 34 (see FIG. 10) to provide an electronic signal proportionate to flow rate;
  the condenser 28 houses a flow-rate regulating device 36 which can be controlled by an electronic controller to regulate the output flow rate; and
  the condenser 28 serves as a flow distributing device to distribute the flow output among the nozzles of a multiplicity of row lines 32 at the same time.

The condenser 28 comprises a sealed vessel having a jacket 42, a main body 44, and a cover 46. In the FIGS. 5-9 embodiment, the main body 44 is a single monolithic block of machined metal. In the FIGS. 11-12 embodiment, the main body 44 is two piece.

The jacket 42 comprises an open-topped cylindrical cannister having an upper rim 48, a cylindrical sidewall 52 having a cylindrical inner surface and a cylindrical outer surface. The jacket 42 also has a closed bottom 54 having an upper interior surface and a lower exterior surface. The sidewall 52 is formed with a single inlet port 56 that is fed directly from the mobile tanks 26. There is no pump. The tanks 26 are under pressure at an internal pressurization that is sufficient to force the NH3 out of the tanks 26, through the condensers 28 and row lines 32, to be dispensed ultimately by the nozzle of each row line 32.

The main body 44 has upper cylindrical shoulder portion 58 and a reduced-diameter lower cylindrical, suspended stem portion 62. The upper shoulder portion 58 rests upon the rim 48 of the jacket 42, and the jacket 42 and upper shoulder portion 58 are sealed tight together. The upper shoulder portion 58 has a top wall 64. The lower stem portion 62 terminates in a bottom wall 66. In the FIGS. 11-12 embodiment of the condenser 28, it is the upper shoulder portion 58 which is two pieces. The lower stem portion 62 is pretty similar for both embodiments.

The upper shoulder portion 58 has a cylindrical outer surface 68 that forms a smooth continuation of the cylindrical outer surface of the sidewall 52 of the jacket 42.

The lower stem portion 62 also has a cylindrical outer surface 72 which has a smaller diameter than the diameter of the inner cylindrical surface of the sidewall 52 of the jacket 42. That way, cylindrical outer surface 72 of the suspended stem portion 62 and the cylindrical inner surface of the sidewall 52 of the jacket 42 form an annular bath 74. Anhydrous ammonia (NH3) enters through the inlet port 56 and empties into this annular bath 74 in a two-phase condition (ie., consisting of both a vapor phase and a condensate phase).

As will be explained more particularly below, the outer surface 72 of the stem portion 62 of the main body 44 is very cold. Under proper conditions, the vapor phase condenses into the condensate phase such that the bottom of the annular bath 74 will consist only of condensate which has sunk there.

The bottom wall 66 of the stem portion 62 is spaced above the upper interior surface of the bottom 54 of the jacket 42. Hence there is a gap 76 between the bottom 54 of the jacket 42 and the bottom wall 66 of the of the stem portion 62.

The main body 44 has an enlarged central bore through the top wall 64 for about one-third or one-fourth of the axial length of the main body 44, or just whatever is needed to mount a flow-rate measuring (or reporting) device 34. FIG. 10 shows better a helical-vane turbine rotor 78 in combination with a magnetic pick-up transducer 82. The helical-vane turbine rotor 78 houses a magnet.

Figure 5:
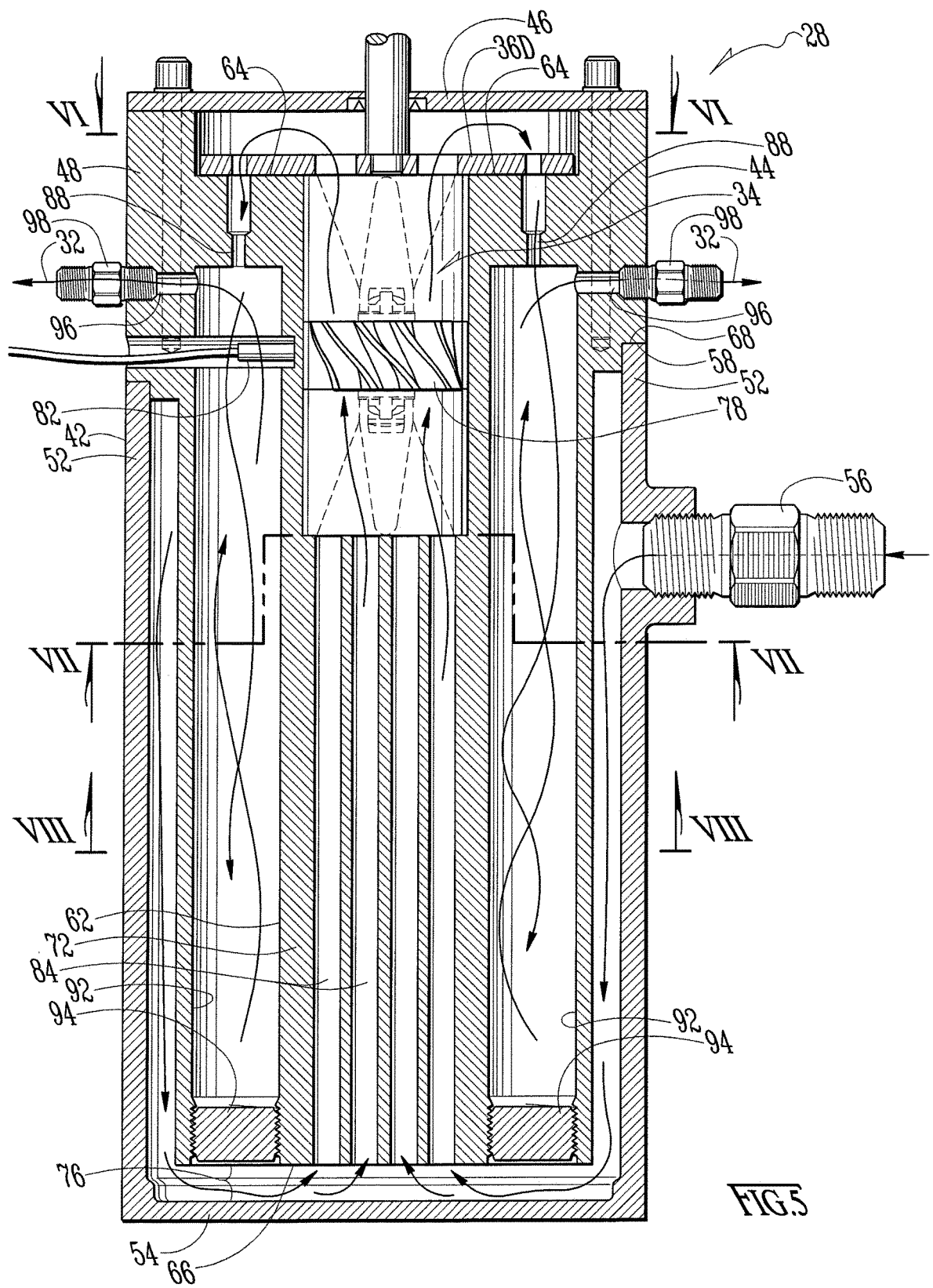
FIG. 5 is an enlarged-scale partial sectional view taken along line V-V in FIG. 4.
Figure 6:
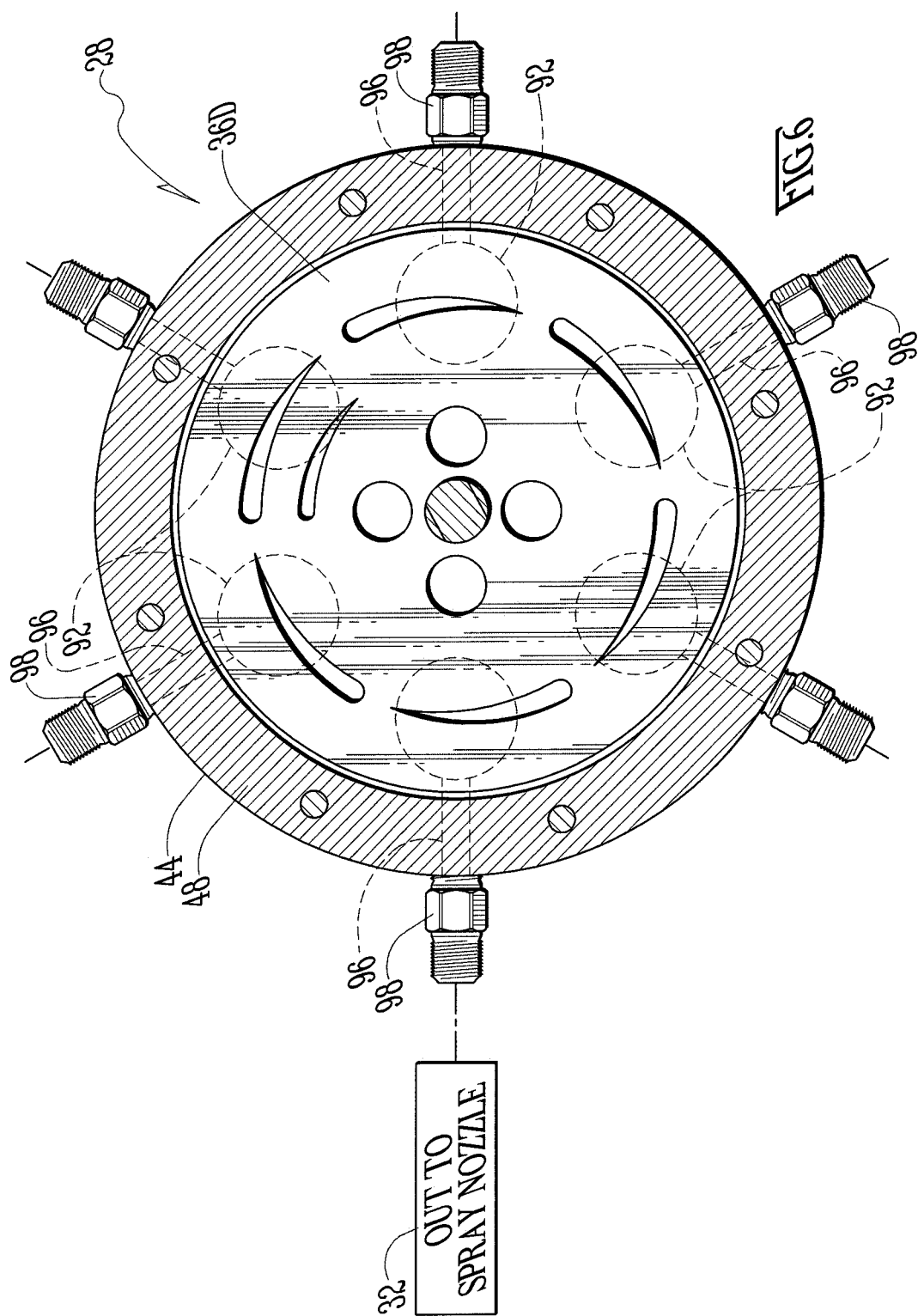
FIG. 6 is an enlarged-scale sectional view taken in the direction of the arrows VI-VI in FIG. 5.
Figure 7:
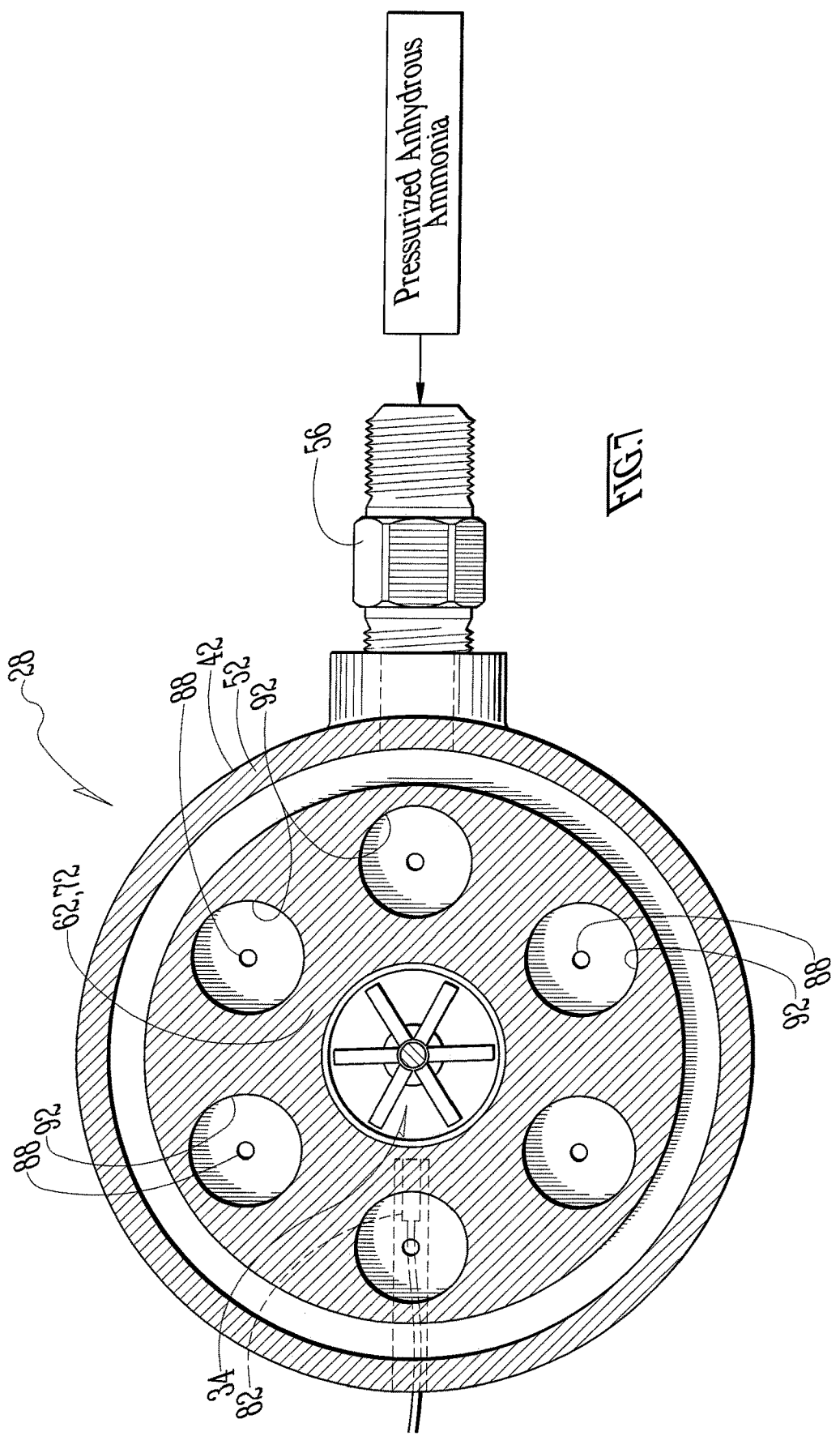
FIG. 7 is an enlarged-scale sectional view taken in the direction of the arrows VII-VII in FIG. 5.

Below the enlarged central bore, the main body 44 (and predominantly in the stem portion 62 thereof) is bored all the through to the bottom with a pattern of parallel, small diameter passages 84. This is shown better by FIG. 8. There are referred to herein as upflow passages 84. Hence condensate flowing through the gap 76 under the bottom wall 66 of the stem portion 62 enters these small diameter upflow passages 84. The condensate flows upwardly through these upflow passages 84 and onward, ultimately past the flow-rate measuring (reporting) device(s) 34. FIGS. 5, 6 and 9 show the condensate flowing up through apertures in a slotted disk of a flow-rate regulating device 36D, before flowing down through the tear-drop shaped slots that perform the flow-rate regulating function of the flow-rate regulating device 36D. The slotted disk is driven by an electric motor 86 such that an electronic controller can adjust the flow-rate output and as based on the information from the signal from the flow-rate measuring (reporting) transducer 82.

In contrast, FIG. 11 shows a ball valve 36B performing the flow-rate regulating function. That is, FIG. 11 shows the condensate flowing past the flow-rate measuring (reporting) device 34 and immediately through the ball valve 36B, which is driven by the control motor M. In both embodiments, after the condensate passes past the flow-rate regulating devices 36, the condensate is distributed among a multiplicity of output flows, one output flow for each row line 32 serviced by the condenser 28 in accordance with the invention.

FIG. 9 shows better where the flow path(s) of the working fluid flows through condenser 28 as two-phase flow (vapor and condensate) in contrast to a single phase flow of condensate alone. Again, the preferred working fluid is anhydrous ammonia (NH3). FIG. 9 also includes representation of imaginary pressure gauges indicated as gauges A through E.

In FIG. 9, the working fluid (eg., NH3) flows past the pressure gauge A at some arbitrary inlet pressure Pa. The pressures at gauges B and C are substantially 99% to 95% of the arbitrary inlet pressure Pa. However, after the fluid flows past gauge C, the fluid flows (down) through an evaporator orifice 88. There is one evaporator orifice 88 for each row line 32 being serviced by the condenser 28.

The resultant jet of working fluid (eg., NH3) squirting through each respective evaporator orifice 88 partly vaporizes to the vapor state, and swirls as a mixture of vapor and condensate in each respective evaporation chamber 92.

FIGS. 5 and 11 may give the appearance that the evaporation chambers 92 are open at the bottom, but the evaporation chambers 92 are not. The evaporation chambers 92 are plugged closed at the bottom by threaded plugs 94. FIG. 9 provides a better representation that each evaporation chamber 92 comprises an elongated hollow cylindrical chamber, with a closed bottom 94, an inlet at the top comprising the evaporator orifice 88, and an exhaust (outlet) port 96 in the sidewall of the evaporation chamber 92, close to the top of the evaporation chamber 92, and outside to a fitting 98 through the outer surface of the upper shoulder portion 58 of the main body 44 (and onward to the row lines 32).

However, to return to FIGS. 5 and 11, those views provide a more real-world representation to how these evaporation chambers 92 are actually formed in the main body 44. The evaporation chambers 92 are bored from the bottom of the stem portion 62 to their upper terminations, and then plugged at the bottom with threaded plugs 94.

To return to FIG. 9, pressure gauge D and pressure gauge E would read about the same pressure as the other, but their (more or less) common pressure will be anywhere from 80% to 20% of the arbitrary inlet pressure Pa.

Both embodiments of the condenser 28 have a cover lid 46 covering the top 64 of the main body 44. Again, the FIGS. 5-9 embodiment is chiefly distinguished by having a slotted disk flow-rate regulating device 36D. The FIGS. 11-12 embodiment is chiefly distinguished by having a ball valve flow-rate regulating device 36B.

As mentioned above, the lower stem portion 62 of the main body 44 is suspended inside the jacket 42. The stem portion 62 could be grounded on the bottom 54 of the jacket 42, and spoke-like flow passages (not shown) could be formed in the stem portion 62 to connect to the array of the small-diameter upflow passages 84. But it is preferred to keep the stem portion 62 from touching the bottom 54 of the jacket 42 so as not to provide a conduction path away from the cold stem portion 62 to a warmer bottom 54 (or sidewall 52) of the jacket 42.

Again, if conditions are maintained right, the fluid flow past the flow measuring (reporting) device 34 should consist of pure condensate, which is achieved by the cold outer surface 72 of the stem portion 62 of the main body 44. That is, the cold outer surface 72 of the stem portion 62 of the main body 44 condenses the vapor of the working fluid (eg., NH3) in the annular bath 74 such that condensate sinks to the bottom of the annular bath 74, and only condensate makes the trip up the upflow passages 84.

Hence the condenser 28 is arranged in a series of annular regions. The outer annular region comprises the annular bath 74 where an infeed of two-phase working fluid (eg., NH3) largely condenses, and the condensate sinks to the bottom.

The inner annular region comprises the array of small-diameter upflow passages 84 where the condensate flows upwardly therethrough, and then past the following various options:— flow rate measuring (reporting) device 34;
flow rate regulating device 36;
flow rate distribution device (or configurations therefor); and so on. Ultimately, the largely condensate working fluid (eg., NH3) is ejected through a respective evaporator orifice 88 for each respective row line 32 served by the condenser 28. The jets squirting out of the evaporator orifices 88 are swirled inside respective evaporation chambers 92 therefor. These evaporation chambers 92 are angularly distributed inside the main body 44 of the condenser 28 in an annular region inside of the annular bath 74, but outside of the core annular region occupied by the array of the small-diameter upflow passages 84.

Hence the condenser 28 in accordance with the invention functioning in part as flow-rate control device 36 to dispense a working fluid such as anhydrous ammonia (NH3) takes advantage of generated cooling capacity of expanded anhydrous ammonia on the exit side of evaporator orifices 88 to cool incoming anhydrous ammonia. This is useful to eliminate any vapor phase in the incoming anhydrous ammonia vapor-condensate mixture. Eliminating vapor from the two-phase mixture is useful as flow-rate measuring (reporting) devices 34 generally are more accurate with vapor-free anhydrous ammonia. The preferred embodiment uses a turbine-style flow meter 34 integrated within the main body 44 of the subject condenser 28. The evaporation chambers 92 included and are of such a generous size that allow for more efficient heat exchange between the incoming warm anhydrous ammonia and exiting cold, expanded anhydrous ammonia in the form of features that allow for more surface contact between main body 44 of the condenser 28 and the incoming and exiting anhydrous ammonia.

As a result, this eliminates the prior art conventional anhydrous ammonia cooling stage in the form of a heat exchanger (not shown) disposed before the flow-rate measuring (reporting) device 34.

The preferred location of this condenser 28 is on the tool bar 24 as close as possible to the row lines 32 (sometimes also referred to as row tubing). Preferably, there are several such condensers 28 distributed on the tool bar 24, each serving as a section control manifold valve for a respective one of several sections on the tool bar 24.

Preferably, the plurality of evaporation chambers 92 comprises between six to eight in number, while the multiplicity of individual channels 84 serving as the upflow passages 84 might be twice as many or more in number. The drawings show a non-limiting example of six evaporation chambers 92 and sixteen individual channels 84 serving as the upflow passages 84.

The individual channels 84 serving as the upflow passages 84 are shows to have a characteristic inside diameter relative to one another, although this is a non-limiting design choice. In contrast, it is preferred if the plurality of evaporation chambers share a characteristic inside diameter, and have an equal length such that the plurality of evaporation chambers have an equal volume. It is also preferred that the geometry and location of the plurality of evaporator orifices 88 and plurality of outlet ports 96 are all the same with respect to each other, such that the geometry of the flow-conducting cavities past the regulating devices 36D,36B and through the outlet fittings 98 is the same for each of the plurality of evaporation chambers 92.

In other words, the symmetry of the flow-conducting cavities past the regulating devices 36D,36B and through the outlet fittings 98 is preferably the same for each of the plurality of evaporation chambers 92.

Figure 8:
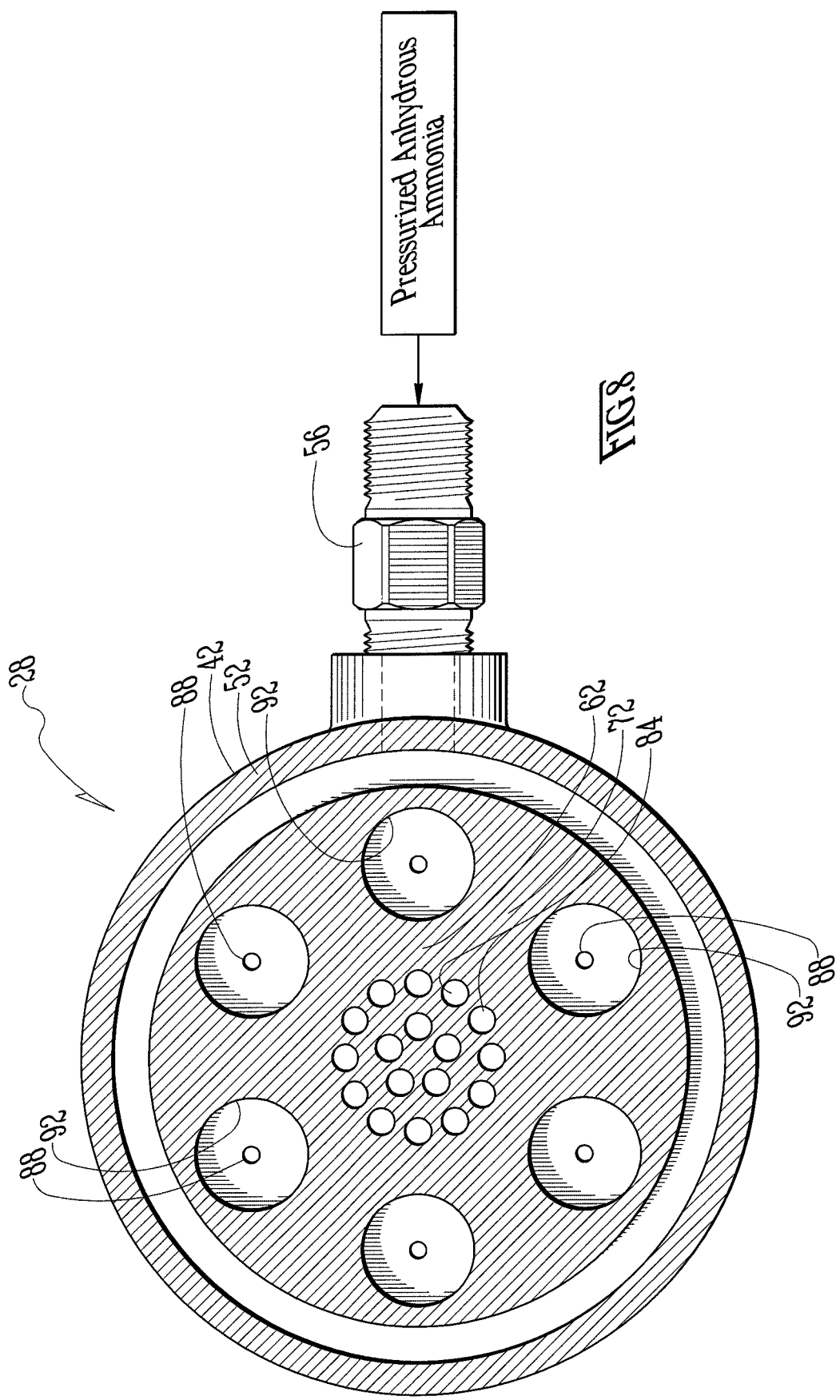
FIG. 8 is an enlarged-scale sectional view taken in the direction of the arrows VIII-VIII in FIG. 5.

FIG. 8 shows that the ratio of the characteristic inside diameter of the evaporation chambers 92, compared to, the characteristic inside diameter of the individual channels 84 serving as the upflow passages 84 is, a ratio of eleven to three. In other words, the diameters of the evaporation chambers 92 are three and two-thirds larger than the diameters of the individual channels 84 serving as the upflow passages 84 (as shown by, eg., FIG. 8).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A combination of a condenser with mobile tank NH3 fertilizer equipment, comprising:
   a mobile tank source of NH3;
   a plurality of row lines that terminate in respective nozzles; and
   a vertically-elongated, generally-upright condensing vessel comprising a sidewall, extending between a top and bottom end, and receiving an infeed of NH3 from the mobile tank source to thereafter distribute among the plurality of row lines;
   said vessel being formed with a series of cavities, some of which are arranged in annular regions, said vessel comprising:—
      a vertically-elongated jacket and a vertically-elongated center body defining a vertically-elongated annular bath;
      said center body being formed with a plurality of vertically-elongated evaporation chambers distributed angularly-spaced apart on an annular ring radially inwards of the annular bath; and
      said center body being further formed with at least one vertically-elongated upflow passage radially inwards of the annular ring of the vertically-elongated evaporation chambers and extending between a lower intake end and upper outflow end;
   said vessel being formed with an inlet for receiving the infeed of NH3 into the annular bath;
   said vessel being formed with a plurality of outlets connecting a respective one of the plurality of evaporation chambers with a respective one of the row lines;
   said vessel being formed with a flow path between the annular bath and the lower intake end of the at least one upflow passage proximate the bottom end of the vessel and bypassing the evaporation chambers; and
   said vessel being formed with a manifold ultimately branching into a plurality of openings to each of the respective ones of the plurality of evaporation chambers, and connecting the upper outflow end of the at least one upflow passage with the plurality of evaporation chambers.

2. The combination of claim 1, further comprising:
   a flow reporting device disposed at least in part in the manifold.

3. The combination of claim 1, further comprising:
   a flow-distributing device disposed at least in part in the manifold.

4. The combination of claim 1, wherein:
the plurality of row lines comprises between six to eight; and
the plurality of evaporation chambers comprise correspondingly between six to eight.

5. The combination of claim 1, wherein:
the upflow passage comprises a multiplicity of individual channels.

6. The combination of claim 5, wherein:
the multiplicity of individual channels are parallel and have lumens characterized by inside diameters;
the plurality of evaporation chambers are parallel and have lumens characterized by a characteristic inside diameter; and
the characteristic inside diameter of the plurality of evaporation chambers is at least twice any of the inside diameters of the multiplicity of individual channels.

7. The combination of claim 6, wherein:
the multiplicity of individual channels have lumens characterized by a characteristic inside diameters; and
the characteristic inside diameter of the plurality of evaporation chambers is at least three times the characteristic inside diameter of the multiplicity of individual channels.

8. The combination of claim 1, wherein:
said jacket has a bottom wall and said center body has a bottom surface;
said flow path between the annular bath and the upflow passage comprises a gap between the bottom wall of the jacket and the bottom surface of the center body.

9. The combination of claim 1, wherein:
the upflow passage comprises a multiplicity of individual channels;
said center body has a bottom surface that is provided with a first set of bores comprising the plurality of evaporation chambers and a second set of bores comprising the multiplicity of individual channels;
said condensing vessel further comprising a plurality of plugs for plugging the first set of bores comprising the plurality of evaporation chambers proximate the bottom surface of the center body.

10. The combination of claim 1, further comprising:
a flow-distributing device disposed at least in part in the manifold;
wherein the symmetry of the flow-conducting cavities past the flow-distributing device and through the outlet fittings is substantially the same for each of the plurality of evaporation chambers.

11. A condenser for a two phase working fluid, comprising:
a source of a two phase working fluid;
a vertically-elongated, generally-upright condensing vessel comprising a sidewall, extending between a top and bottom end, and receiving an infeed of the two phase working fluid from the source to thereafter output to an outflow line;
said vessel being formed with a series of cavities, some of which are arranged in annular regions, said vessel comprising:—
a vertically-elongated jacket and a vertically-elongated center body defining a vertically-elongated annular bath;
said center body being formed with a plurality of vertically-elongated evaporation chambers distributed angularly-spaced apart on an annular ring radially inwards of the annular bath; and
said center body being further formed with at least one vertically-elongated upflow passage radially inwards of the annular ring of the vertically-elongated evaporation chambers and extending between a lower intake end and upper outflow end;
said vessel being formed with an inlet for receiving the infeed of two phase working fluid into the annular bath;
said vessel being formed with a plurality of outlets connecting a respective one of the plurality of evaporation chambers with to at least one outflow line;
said vessel being formed with a flow path between the annular bath and the lower intake end of the at least one upflow passage proximate the bottom end of the vessel and bypassing the evaporation chambers; and
said vessel being formed with a manifold ultimately branching into a plurality of openings to each of the respective ones of the plurality of evaporation chambers, and connecting the upper outflow end of the at least one upflow passage with the plurality of evaporation chambers.

12. The combination of claim 11, further comprising:
a flow reporting device disposed at least in part in the manifold.

13. The combination of claim 11, further comprising:
a flow-distributing device disposed at least in part in the manifold.

14. The combination of claim 13, further comprising:
a flow reporting device disposed at least in part in the manifold.

15. The combination of claim 11, wherein:
the at least one outflow lines comprises a plurality of outflow lines, one for each evaporation chamber.

16. The combination of claim 11, wherein:
the upflow passage comprises a multiplicity of individual channels;
the multiplicity of individual channels are parallel and have lumens characterized by inside diameters;
the plurality of evaporation chambers are parallel and have lumens characterized by a characteristic inside diameter; and
the characteristic inside diameter of the plurality of evaporation chambers is at least twice any of the inside diameters of the multiplicity of individual channels.

17. The combination of claim 16, wherein:
the multiplicity of individual channels have lumens characterized by a characteristic inside diameters; and
the characteristic inside diameter of the plurality of evaporation chambers is at least three times the characteristic inside diameter of the multiplicity of individual channels; and
the multiplicity of individual channels are at least twice as numerous as the plurality of evaporation chambers.

18. The combination of claim 11, wherein:
the upflow passage comprises a multiplicity of individual channels;
said center body has a bottom surface that is provided with a first set of bores comprising the plurality of evaporation chambers and a second set of bores comprising the multiplicity of individual channels;
said condensing vessel further comprising a plurality of plugs for plugging the first set of bores comprising the plurality of evaporation chambers proximate the bottom surface of the center body.

19. The combination of claim 11, further comprising:
a flow-distributing device disposed at least in part in the manifold;

wherein the symmetry of the flow-conducting cavities past the flow-distributing device and through the outlet fittings is substantially the same for each of the plurality of evaporation chambers.

* * * * *